Oct. 21, 1930.  W. E. SWERN  1,779,376
TIRE FORMING MACHINE
Original Filed June 12, 1923
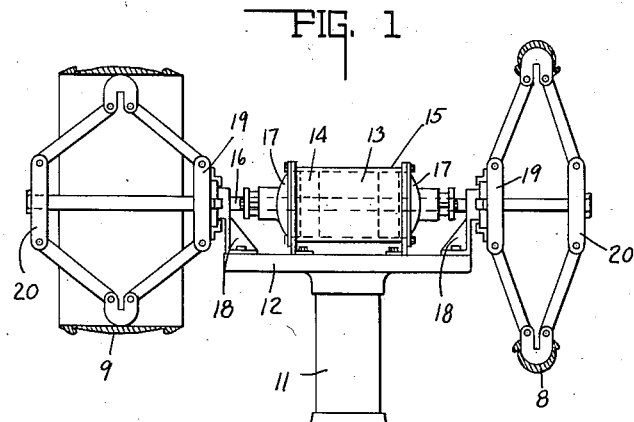
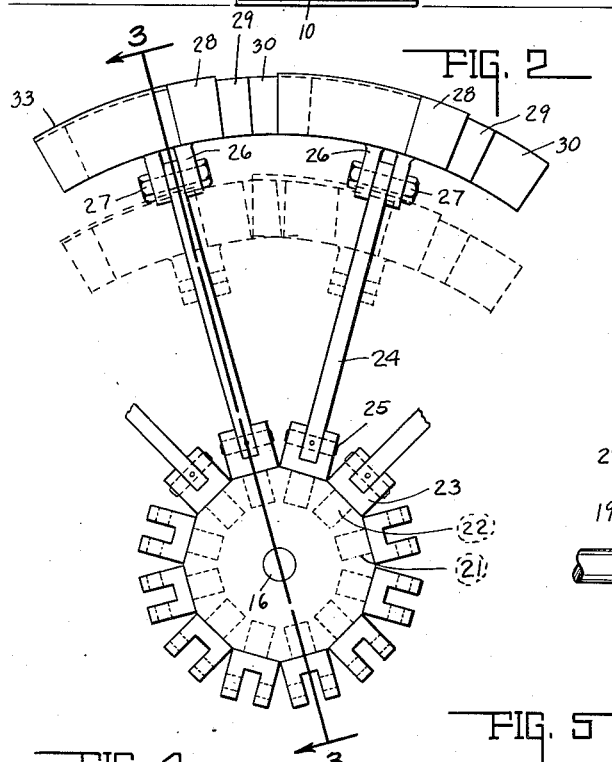
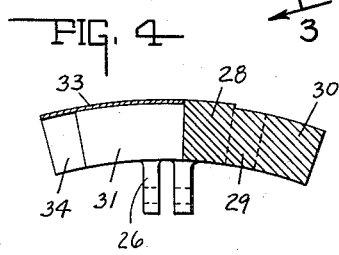
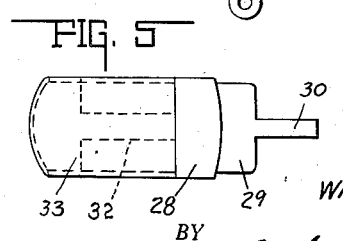
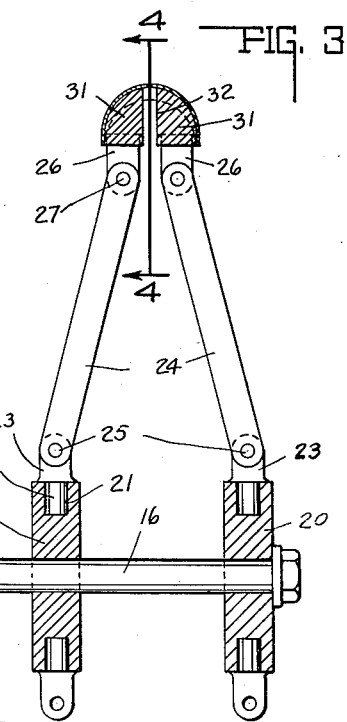
INVENTOR.
WILLIAM E. SWERN,
BY
ATTORNEYS.

Patented Oct. 21, 1930

1,779,376

UNITED STATES PATENT OFFICE

WILLIAM E. SWERN, OF KOKOMO, INDIANA, ASSIGNOR, BY DIRECT AND MESNE ASSIGNMENTS, OF ONE-HALF TO THE FISK RUBBER COMPANY, OF CHICOPEE FALLS, MASSACHUSETTS, A CORPORATION OF MASSACHUSETTS, AND ONE-HALF TO THE GOODYEAR TIRE & RUBBER COMPANY, OF AKRON, OHIO, A CORPORATION OF OHIO

TIRE-FORMING MACHINE

Application filed June 12, 1923, Serial No. 645,008. Renewed June 14, 1929.

This invention relates to a machine for forming tires from a flat cylindrical casing.

The chief object of the invention is to form a partially tubular and cylindrical tire casing from a flat tire casing by expanding a "solid" core from a diameter substantially corresponding to the flat casing to a diameter substantially corresponding to the completed tire casing and thereby obviate the necessity of using a pneumatic expansible core.

Another object of the invention is to construct a machine which will increase the production rate.

The chief feature of the invention consists in providing in a tire forming machine a plurality of circumferential segments or sectors whch are telescopically associated together so that the same may be extended to form a substantially continuous circumferential core of greater diameter than the rim.

Another feature of the invention consists in constructing the machine so that it is double acting or differentially acting, that is, one expansible core is expanded and contracted while another expansible core is simultaneously contracted and expanded respectively, thereby doubling the output of the machine for a given power input.

Another feature of the invention consists in the construction of an expansible core which in all positions will form a substantially continuous peripheral core of substantially uniform diameter throughout the core, thereby insuring a uniform inner surface to the resilient tire casing.

Another feature of the invention consists in the provision of two relatively movable hubs to which a plurality of circumferential core-forming sections or segments are connected by toggle links, whereby said sections will be moved radially in a plane transverse to the axis including the hubs and intermediate the same.

The full nature of the invention will be understood from the accompanying drawings and the following description and claims.

In the drawings, Fig. 1 is a side elevational view of one form of a double acting tire forming machine with the tire forming cores and the tires shown in central section. Fig. 2 is an enlarged side elevational view of a portion of the circumferential core, the toggle link support therefor and the hub associated therewith, the full lines illustrating an expanded position of the core and the dotted lines indicating a contracted position of the core. Fig. 3 is a transverse sectional view taken on the line 3—3 of Fig. 2 and in the direction of the arrows. Fig. 4 is a sectional view taken on the line 4—4 of Fig. 3 and in the direction of the arrows. Fig. 5 is an enlarged top plan view of one of the core forming segments.

In the drawings 10 indicates a suitable base supporting a pedestal 11, in turn supporting a table 12. The table 12 supports a power unit, herein shown in the form of a fluid pressure cylinder 13. The piston in said cylinder is indicated by the dotted lines in Fig. 1 and by the numeral 14. The other extreme position of the piston is indicated by the dotted lines 15. A piston rod 16 extends through the cylinder and the piston 14 is rigidly secured thereto. The piston rod 16 extends through the cylinder heads 17, and herein is shown slidably mounted by bearings formed in the supporting brackets 18, which also stationarily support the hubs 19. The piston rod 16 is extended through the hubs 19, and upon its free ends carries the hubs 20. Fig. 1 illustrates one pair of hubs 19 positioned adjacent each other, while the other pair of hubs 20 is shown positioned at a greater distance from each other. It will be noted, therefore, that one of the two hubs adjacent each end of the rod 16 is relatively movable with respect to the other and that they are co-axially mounted. The admission of fluid pressure to one end of the cylinder 13 will cause the piston 14 to move to the opposite end of the cylinder, and subsequent admission of fluid pressure to the opposite end of the cylinder will cause the return movement of the piston. In this reciprocatory movement of the piston, the piston rod 16 moves to and fro, carrying with it the movable hubs 20 for alternately expanding and contracting the segmental circumferential core.

Reference will now be had particulary to Figs. 2, 3 and 4. Herein each of the hubs 19 and 20 is shown polygonal in outline, see Fig. 2, and each face of the hub is provided with a recess 21, which recess is adapted to receive the end 22 of a slotted pivotal support 23. Pivotally supported in each of the slotted pivotal supports 22 is one end of a toggle link 24. The pin 25 serves to secure said link to the slotted support. The circumferential core segments are each provided with a pair of slotted ears 26 which lie in the same radial plane including the axis of the hubs. The other ends of said links 24 are pivotally supported by the pair of ears 26, through suitable means indicated by the numeral 27.

Herein the hub is shown provided with twelve faces, and extending from each face, as previously described, is a toggle link; and supported by a pair of toggle links is a circumferential core forming section. It is to be understood that the number of core forming sections may be varied, and preferably will be increased as the diameter of the completed tire casing increases in size. Likewise, greater uniformity and a closer approximation to the true circumference will result from an increased number of sections. Herein twelve sections are illustrated, although the number may be increased or reduced as required or desired, as previously indicated. As shown clearly in Figs. 1 and 3, the two hubs 19 and 20 are or may be rotatably supported upon the shaft 16, the only requisite being that one of the hubs be held against axial movement with respect to the shaft, and the other of the hubs being movable axially with the shaft, or both being relatively movable axially of the shaft. When positioned as shown, the entire circumferential expansible core forming sectional construction may be rotated upon the shaft 16, so that any adjustment or work may be performed upon the tire casing supported thereby. In Fig. 1 the tire casing is shown in its extreme forms, 9 indicating the flat cylindrical tire casing before formation into the completed tire, and 8 indicating the completed or formed tire casing.

Since each of the circumferential core forming segments is substantially similar and may be identical with the others, a description of one will suffice for an understanding of them all. In said figures a curved and preferably arcuate body portion, see Fig. 4, is indicated by the numeral 28, and said body portion is curved upon its outer and peripheral forming face, as shown in Fig. 3. Preferably integral with the body portion 28 is a reduced portion 29 which terminates in a tongue portion 30. The tongue portion 30 is herein shown comprising a single extension arcuate in central section, as shown in Figs. 2 and 4. Opposite from the tongue 30 and extending from the body portion 28 and preferably integral therewith is a slotted portion 31 having the slot 32 therein. The slot 32 is herein shown medianly positioned and is adapted to receive the tongue portion 30 of the next adjacent segment when in the retracted position, as shown by the dotted lines in Fig. 2.

In order to insure a comparatively smooth circumferential periphery, a hood 33 is provided which encloses substantially the slotted portion 31 and projects as at 34 beyond the same. When the segments are in assembled relation with respect to each other and in circumferential formation, the tongue 30 of each segment is adapted to be received by the slot 32 of the slotted portion 31 when the segments are in the retracted position. When the segments are in the extended position, the tongue is withdrawn from the slot 32 as the segments are projected outwardly by the toggle links, and the resultant circumferential core is as shown by the full lines in Fig. 2.

The invention claimed is:

1. A tire forming machine comprising a plurality of arcuate peripheral core forming sections adapted to form a substantially circular core at all diameters, a pair of coaxial hubs, a pair of links connecting each of the sections to the hubs and constituting a toggle arrangement, one of the hubs being movable relatively towards and away from the other, and coaxial slidable means for moving said hubs relatively of each other.

2. A device of the character defined by claim 1, in combination with a fluid containing cylinder, a piston reciprocable therein, and means connecting said piston to the sliding means for reciprocating the latter.

3. A tire forming machine having a pair of aligned tire forming devices, each as defined by claim 1, and including a fluid containing cylinder therebetween, fluid operable piston means therein, a common piston rod extending oppositely from said cylinder and connected to the slidable means for alternately causing relative movement of one of the two hubs of each device towards and away from the other for alternately expanding and contracting each of said devices, one of the devices being expanded simultaneously with the contraction of the other device.

4. In a tire forming machine for securing substantially full circumferential support at different diameters, the combination of a plurality of substantially similar tire engageable core forming sections, each having a body portion with a circumferential and radial groove in one end and a complimentary groove receivable tongue projecting from the opposite end, the adjacent sections having telescopic relations between the adjacent complimentary tongue and groove, a relatively thin arcuate tire engageable hood closing the groove at the outer periphery of this section and telescopically associated with the exterior periphery of the adjacent tongue for constantly covering the junction between the tongue and groove.

5. A tire shaping device comprising an annulus variable in circumference, said annulus including telescoping arcuate segments to provide substantially continuous tire engaging surfaces, a pair of hubs having link connections to each segment, means having a sliding engagement with one of the hubs, a support for latter hub, a fixed connection securing the other hub to said means, and a mechanism connected to the means for relatively moving the hubs to vary the circumference of the annulus.

In witness whereof, I have hereunto affixed my signature.

WILLIAM E. SWERN.